United States Patent [19]

Maeda et al.

[11] Patent Number: 6,166,141
[45] Date of Patent: Dec. 26, 2000

[54] FLUORINE-CONTAINING RESIN FOR PREPARING PAINT

[75] Inventors: Kazuhiko Maeda, Tokyo; Yukio Ikeda, Saitama; Kentaro Tsutsumi, Saitama; Seiji Hasegawa, Saitama, all of Japan

[73] Assignee: Central Glass Company, Limited, Ube, Japan

[21] Appl. No.: 08/873,231

[22] Filed: Jun. 11, 1997

[30] Foreign Application Priority Data

Jun. 11, 1996 [JP] Japan .................................... 8-148793
Dec. 2, 1996 [JP] Japan .................................... 8-321723

[51] Int. Cl.$^7$ ........................... C08L 27/12; C08F 214/18
[52] U.S. Cl. .......................... 525/199; 526/242; 526/245; 526/247; 526/249; 526/255; 526/252; 524/546
[58] Field of Search ........................... 525/199; 526/242, 526/245, 247, 249, 255, 252; 524/546

[56] References Cited

U.S. PATENT DOCUMENTS

| | | | |
|---|---|---|---|
| 4,631,326 | 12/1986 | Koishi et al. | 526/249 |
| 4,690,968 | 9/1987 | Mitani et al. | 524/546 |
| 4,985,519 | 1/1991 | Koishi et al. | 526/249 |
| 5,200,480 | 4/1993 | Maruyama et al. | 526/249 |
| 5,447,982 | 9/1995 | Kamba et al. | 524/458 |
| 5,965,275 | 10/1999 | Nishi et al. | 525/276 |

FOREIGN PATENT DOCUMENTS

| | | |
|---|---|---|
| 0 320156A2 | 6/1989 | European Pat. Off. |
| 0 341716A2 | 11/1989 | European Pat. Off. |
| 0 675182A1 | 10/1995 | European Pat. Off. |
| 58-206615 | 12/1983 | Japan . |
| 59-41315 | 3/1984 | Japan . |
| 61-43667 | 3/1986 | Japan . |
| 61-247717 | 11/1986 | Japan . |
| 62-295914 | 12/1987 | Japan . |
| 2-58513 | 2/1990 | Japan . |
| 6-25595 | 2/1994 | Japan . |

OTHER PUBLICATIONS

Patent Abstracts of Japan, 06025595, Feb. 1, 1994.
Patent Abstracts of Japan, 59041315, Mar. 7, 1984.

*Primary Examiner*—James J. Seidleck
*Assistant Examiner*—Olga Asinovsky
*Attorney, Agent, or Firm*—Evenson, McKeown, Edwards & Lenahan, P.L.L.C.

[57] ABSTRACT

The invention relates to a fluorine-containing resin (graft copolymer) used for preparing a paint. This resin is prepared by a graft copolymerization of a fluorine-containing copolymer with a first monomer composition. The fluorine-containing copolymer comprises a first constitutional unit derived from a fluoroolefin and at least one of second and third constitutional units. The second constitutional unit is derived from a particular carboxylic acid vinyl ester represented by a general formula of $R-C(=O)OCH=CH_2$ where R is a special group. The third constitutional unit is derived from a first monomer which is at least one compound selected from vinyl ethers and allyl ethers. The first monomer is represented by a general formula of $R-O-(CH_2)n-CH=CH_2$. The first monomer composition for preparing the resin contains a second monomer which is at least one compound selected from methacrylic acid esters and acrylic esters. The second monomer is represented by a general formula of $CH_2=C(-R')C(=O)O-R$ where R' is hydrogen atom or methyl group. A composition prepared by mixing the resin with vinylidene fluoride resin or with a combination of vinylidene fluoride resin and acrylic resin is capable of providing a coated film having high gloss, high weather resistance, and good results in bending test for a long time. Another composition prepared by mixing the resin with a hardener is capable of providing a coated film having high hardness, good adhesion to various other coated films, high weather resistance, and high stain resistance.

9 Claims, No Drawings

FLUORINE-CONTAINING RESIN FOR PREPARING PAINT

BACKGROUND OF THE INVENTION

The present invention relates to fluorine-containing resins, particularly fluorine-containing great resins, and to coating compositions each containing such graft resin.

Hitherto, various fluororesin paints have been used by the reason of superior weather resistance of fluorine-containing copolymer contained therein. Of these paints, there is widely used baking paint which is made up of a mixture of polyvinylidene fluoride and acrylic resin. Furthermore, there have been proposed fluororesins which have cross-linking sites and are suitable for solvent-thinned paints. These fluororesins are widely used as weather resistant paint in various fields such as architectural, automotive and chemical industries. For example, Japanese Patent Unexamined Publication JP-A-57-84107 discloses a fluorine-containing copolymer which is curable at room temperature and comprises a fluoroolefin, cyclohexylvinyl ether, an alkylvinyl ether, and an hydroxyalkylvinyl ether. This hydroxyalkylvinyl ether provides a functional group to the copolymer for curing the copolymer. U.S. Pat. No. 4,631,326 corresponding to JP-A-61-57609 discloses a fluorine-containing copolymer comprising chlorotrifluoroethylene, a vinyl or isopropenyl ester of fatty acid and a hydroxyl-containing allyl ether. This allyl ether provides a functional group to the copolymer for curing the copolymer. Polyvinylidene-fluoride-based baking paints are low in gloss, and thus are not suitable for uses that require high gloss. Paints containing the above-mentioned fluororesins, which have cross-linking sites and are suitable for solvent-thinned paints, are high in gloss, but are inferior in bending test result. Furthermore, these fluororesins are relatively high in price, and thus their uses have been limited.

There have been proposed various fluorine-containing graft resins prepared by graft copolymerization of monomers with fluororesins. These monomers are used for the purpose of improving the coating film in hardness, adhesion property to the substrate, and the like. For example, each of JP-A-59-41315 and JP-A-61-247717 discloses a first graft copolymer prepared by graft copolymerization of a fluorine-containing resin with a monomer. This resin has a reactive C—C double bond and alkoxyl group or cyclohexyloxy group, and this monomer is an ethylenic unsaturated monomer which is copolymerizable with the C—C double bond. JP-A-62-295914 discloses a second graft copolymer prepared by graft copolymerization of a fluorine-containing resin with a monomer. This resin has a reactive double bond by means of urethane bond, and this monomer is an ethylenic unsaturated monomer which is copolymerizable with the double bond. There have further been proposed graft copolymers of fluorine-containing acrylic resins. For example, JP-A-61-43667 discloses a solvent-thinned paint containing a graft copolymer and a polyurethane. This graft copolymer is prepared by graft copolymerization of a monomer with a polymer containing a major constitutional unit derived from an alkylacrylate or an alkylmethacrylate. This monomer is an acrylate or a methacrylate, which has a perfluoroalkyl group. JP-A-2-58513 discloses a fluorine-containing graft copolymer prepared by graft polymerization of a trunk polymer having a particular constitutional unit disclosed therein, with a fluorine-containing monomer which is a fluoroalkylacrylate or a fluoroalkylmethacrylate. JP-A-58-206615 discloses an elastic fluorohyrocarbon resin prepared by graft copolymerization of a fluorine-containing, elastomeric copolymer with at least one fluorine-containing monomer. This copolymer has peroxy groups in the molecule. JP-A-6-25595 discloses a coating composition containing a graft copolymer. This graft copolymer is prepared by graft copolymerization of a vinylidene fluoride polymer with (meth)acrylic ester. This vinylidene fluoride polymer has peroxy group in the molecule.

There is need for baking paints which are reasonable in price and are capable of providing a coated film having high gloss, high weather resistance, and good results in bending test for a long time. Furthermore, there is need for fluororesins which are used as vehicle of baking paints and are superior in solvent solubility, weather resistance, cross-linking property, and adhesion property to various substrates.

SUMMARY OF THE INVENTION

It is therefore an object of the present invention to provide a first baking paint which is capable of providing a coated film having high gloss, high weather resistance, and good results in bending test for a long time.

It is another object of the present invention to provide a second paint which is curable at ambient temperature and is capable of providing a coated film having high hardness, good adhesion to various other coated films, high weather resistance, and high strain resistance.

It is still another object of the present invention to provide a fluorine-containing resin which is a vehicle of the first and second paints.

It is a further object of the present invention to provide a coating composition containing such fluorine-containing resin.

According to the present invention, there is provide a fluorine-containing resin (graft copolymer) used for preparing a paint. This resin is soluble in an organic solvent and is prepared by a fluorine-containing copolymerization of a fluorine-containing copolymer with a first monomer composition. The fluorine-containing copolymer comprises a first constitutional unit derived from a fluoroolefin and at least one of second and third constitutional units. The second constitutional unit is derived from a carboxylic acid vinyl ester represented by a general formula of R—C(=O)OCH=$CH_2$ where R is a first group which is an alkyl group, a cycloalkyl group or an aromatic group. The first group has a carbon atom number of from 1 to 22. The alkyl group has an optional branch. In other words, the alkyl group is defined in the present application as being that the alkyl group may or may not have a branch, by the use of a term of "optional". Hereinafter, the term of "optional" will be used in the same manner as this. Each of the cycloalkyl group and the aromatic group has an optional alkyl substituent. The first group has at least one optional substituent which has been substituted for at least one hydrogen atom of the first group. The at least one optional substituent is selected from the group consisting of hydroxyl group, epoxy group, amino group and alkoxysilyl group. The above-mentioned third constitutional unit is derived from a first monomer which is at least one compound selected from the group consisting of vinyl ethers and allyl ethers. The first monomer is represented by a general formula of R—O—$(CH_2)$n—CH=$CH_2$ where R is defined as above, and n is 0 or 1. The above-mentioned first monomer composition for preparing the fluorine-containing resin contains a second monomer which is at least one compound selected from the group consisting of methacrylic acid esters and acrylic esters. The second fluorine-containing is represented by a general formula of $CH_2$=C(—R')C(=)O—R where R is defined as above, and R' is hydrogen atom or methyl group.

According to the present invention, there is further provided a coating composition comprising 100 parts by weight of the above fluorine-containing resin, 10–500 parts by weight of a vinylidene fluoride polymer, and an organic solvent.

According to the present invention, there is still further provided a coating composition comprising the fluorine-containing resin, a hardener, and an organic solvent.

In the process for achieving the present invention, the inventors have unexpectedly found that a special fluorine-containing graft resin is well compatible with vinylidene fluoride resin. This graft resin has a trunk polymer and a branch polymer. The trunk polymer has a constitutional unit derived from a fluoroolefin and another constitutional unit derived from at least one special hydrocarbon monomer each having an ethylenic unsaturated bond. This hydrocarbon monomer corresponds to the above-mentioned carboxylic acid vinyl ester or the above-mentioned first monomer. The branch polymer of the graft resin is prepared from a monomer composition containing (meth)acrylic ester. In the application, "(meth)acrylic ester" means at least one compound selected from the group consisting of methacrylic acid esters and acrylic esters. The inventors further unexpectedly found that a composition prepared by mixing the special graft resin with vinylidene fluoride resin or with a combination of vinylidene fluoride resin and acrylic resin is capable of providing a coated film having high gloss, high weather resistance, and good results in bending test for a long time. The inventors still further unexpectedly found that a composition prepared by mixing the special graft resin with a hardener (e.g., polyisocyanate and melamine resin) is also capable of providing a coated film having high hardness, good adhesion to various other coated films, high weather resistance, and high strain resistance.

DESCRIPTION OF THE PREFERRED EMBODIMENTS

As stated above, the fluorine-containing copolymer according to the present invention contains a first constitutional unit derived from a fluoroolefin. This fluoroolefin is a substituted ethylene of which at least one hydrogen atom has been replaced by a fluorine atom(s) and of which at least one other hydrogen atom has optionally been replaced by halogen (fluorine, chlorine, or bromine), fluoromethyl group, difluoromethyl group, trifluoromethyl group, and the like. Nonlimitative examples of the fluoroolefin are chlorotrifluoroethylene, tetrafluoroethylene, vinylidene fluoride, vinyl fluoride, trifluoroethylene, hexafluoropropene, hexafluoroisobutene, and mixtures of at least two of these. Of these, chlorotrifluoroethylene is particularly preferable. The proportion of the fluoroolefin in the total of all the monomers for preparing the fluorine-containing copolymer is not particularly limited, but is preferably at least 20 mol %, more preferably at least 40 mol %, in order to provide a coated film having high weather resistance. Furthermore, this proportion is preferably up to 70 mol %, more preferably up to 60 mol %, in order to make the fluorine-containing resin superior in solvent solubility.

As stated above, in addition to the first constitutional unit, at least one of the second and third constitutional units is incorporated into the fluorine-containing copolymer, mainly for the purpose of making the fluorine-containing graft copolymer soluble in solvent. As mentioned above, the second and third constitutional units are respectively derived from the carboxylic acid vinyl ester and from the first monomer which is at least one compound selected from vinyl ethers and allyl ethers. Of these compounds, the carboxylic acid vinyl ester is particularly preferable, in order to obtain a sufficient compatibility of the fluorine-containing copolymer (trunk polymer) with the branch polymer. The carboxylic acid vinyl ester, represented by a general formula of R—C(=O)OCH=$CH_2$ where R is defined as above, is a vinyl ester of an aliphatic, alicyclic, or aromatic carboxylic acid. Examples of the carboxylic acid vinyl ester are vinyl acetate, vinyl propionate, vinyl lactate, vinyl pivalate, vinyl caproate, vinyl caprylate, vinyl laurate, vinyl myristate, vinyl palmitate, vinyl stearate, neononanoic acid ethenyl ester, neodecanoic acid ethenyl ester, and vinyl benzoate. The above-mentioned first monomer is represented by a general formula of R—O—$(CH_2)n$—CH=$CH_2$ where R is defined as above, and n is 0 or 1. Examples of the vinyl ethers as the first monomer are methyl vinyl ether, ethyl vinyl ether, butyl vinyl ether, and cyclohexyl vinyl ether. Examples of the ally ethers as the first monomer are ethylallyl ether, butylallyl ether, benzylallyl ether, and cyclohexylallyl ether. The total of at least one of the carboxylic acid vinyl ester and the first monomer, used for making the graft copolymer soluble in solvent, is in an amount preferably of from 20 to 80 mol %, more preferably of from 30 to 60 mol %, still more preferably of from 35 to 55 mol %, based on the total number of moles of all the monomers for preparing the fluorine-containing copolymer.

In the invention, it is preferable that a comonomer which is to be copolymerized with a fluoroolefin, that is, at least one of the carboxylic acid vinyl ester and the first monomer (i.e., at least one of vinyl ethers and allyl ethers), has a functional group which is carboxyl group, hydroxyl group, epoxy group, amino group or alkoxysilyl group, for the purpose of introducing the cross-linking sites or the graft copolymerization initiating sites into the fluorine-containing copolymer. In addition to the above comonomer, it is optional to use at least one polymerizable monomer having the above functional group, for the same purpose as above, irrespective of the above-mentioned criteria of the comonomer.

Examples of the above polymerizable monomer having hydroxyl group are allyl alcohol; hydroxyalkyl ally ethers each having a hydroxyalkyl group having a carbon atom number of from 2 to 8, such as ethylene glycol monoallyl ether, propylene glycol monoallyl ether and hydroxybutyl allyl ether; alkylene glycol monoallyl ethers each having at least two alkylene glycol groups having a carbon atom number of from 7 to 40, such as diethylene glycol monoallyl ether and polyethylene glycol monoallyl ether; hydroxyalkyl vinyl ethers such as hydroxymethyl vinyl ether, hydroxyethyl vinyl ether, hydroxybutyl vinyl ether, hydroxypentyl vinyl ether and hydroxyhexyl vinyl ether; polyethylene glycol monovinyl ethers such as diethylene glycol monovinyl ether, and crotonic acid modified compounds such as crotonic acid hydroxyethyl. As stated above, the polymerizable monomer having hydroxyl group is optionally used in the preparation of the fluorine-containing copolymer. Its amount is preferably up to 30 mol %, more preferably up to 20 mol %, based on the total number of moles of all the monomers for preparing the fluorine-containing copolymer. If it exceeds 30 mol %, the coated film may become inferior in water resistance and weather resistance.

The above-mentioned polymerizable monomer having carboxyl group is optionally used in the preparation of the fluorine-containing copolymer, in order to introduce carboxyl group into the fluorine-containing copolymer. Such polymerizable monomer is preferably an unsaturated carboxylic acid having a carbon atom number of from 2 to 12. Examples of this carboxylic acid are undecylenic acid, crotonic acid, acrylic acid, and methacrylic acid. Its amount is preferably up to 10 mol %, more preferably up to 5 mol %, based on the total number of moles of all the monomers used in the preparation of the fluorine-containing copolymer. If it exceeds 10 mol %, the coated film may become inferior in water resistance and weather resistance.

The polymerizable monomer having epoxy group or amino group is optionally used in the preparation of the fluorine-containing copolymer, in order to introduce epoxy group or amino group into the fluorine-containing copolymer. Preferable examples of such polymerizable monomer are allyl glycidyl ether, vinyl glycidyl ether, acrylic glycidyl ester, methacrylic acid glycidyl ester, allyl amine, and vinylalkoxysilanes such as vinylmonoalkoxysilane, vinyldialkoxysilane and vinyltrialkoxysilane (e.g., vinyltrimethoxysilane and vinyltriethoxysilane). The amount of such polymerizable monomer is preferably up to 10 mol %, more preferably up to 5 mol %, based on the total number of moles of all the monomers used in the preparation of the fluorine-containing copolymer. If it exceeds 10 mol %, the coated film may become inferior in water resistance and weather resistance.

In the invention, the above functional group (i.e., carboxyl group, hydroxyl group, epoxy group, amino group, or alkoxysilyl group) is contained preferably in the fluorine-containing copolymer (trunk polymer) or the branch polymer of the graft copolymer, more preferably in both the trunk and branch polymers, in order to improve the coated film in weather resistance and in bending property.

In the preparation of the fluorine-containing copolymer, it is preferable to use a monomer which is an ε-caprolactone-modified vinyl or allyl ether and another monomer which is a vinyl or allyl compound having a β-ketoester group, in order to improve compatibility of the fluorine-containing copolymer with the branch polymer. An example of the former monomer is an ε-caprolactone-modified vinyl or allyl ether having a group represented by a formula of —C(=O)(CH$_2$)$_5$O)—. This group is obtained by the ring-opening addition of ε-caprolactone to a hydroxylalkyl group. An exemplary commercial product of such monomer is PLACCEL of DAICEL CHEMICAL INDUSTRIES, LTD. A preferable example of the latter monomer a β-ketoester group is allyl acetoacetate having at a side chain thereof a group represented by a formula of [—OC(=O)CH$_2$C(=O)CH$_3$]. By the introduction of the above polar monomers into the fluorine-containing copolymer, the fluorine-containing copolymer is improved in compatibility with the branch polymer. Furthermore, it becomes possible to obtain a coated film having high gloss, even if the coated film is high in fluorine content. By the use of the above monomer having a β-ketoester group, it becomes possible to use a hardener selected from metal alkoxides, chelate compounds and hydrazine compounds, besides polyisocyanate and melamine hardeners.

In the preparation of the fluorine-containing copolymer, it is preferable to use a glycerol monoallyl ether having a secondary hydroxyl group and having two hydroxyl groups in the molecule. Even a small amount of such ether makes the graft copolymer high in hydroxyl value. Furthermore, the secondary hydroxyl group is low in reactivity when the coating composition is cured, and therefore it remains in the coated film in the form of hydroxyl group. Thus, the coated film surface becomes hydrophilic, thereby to improve the coated film in stain resistance.

In the invention, it is optional to use a monomer having peroxy group, in order to introduce the graft copolymerization initiating sites into the fluorine-containing copolymer. Such peroxy group in the fluorine-containing copolymer serves as the radical polymerization initiating point in the graft copolymerization of the fluorine-containing copolymer with the first monomer composition containing the second monomer which is at least one selected from methacrylic acid esters and acrylic esters. Such monomer having peroxy group may be one of various unsaturated peroxyesters and peroxycarbonates. Examples of this monomer are t-butyl peroxymethacrylate, di(t-butylperoxy)fumarate, t-butyl peroxycrotonate, t-butyl peroxyallylcarbonate, t-hexyl peroxyallylcarbonate, 1,1,3,3-tetramethylbutyl peroxyallylcarbonate, t-butyl peroxymethallylcarbonate, 1,1,3,3-tetramethylbutyl peroxymethallylcarbonate, p-menthane peroxyallylcarbonate, and p-mentane peroxymethallylcarbonate. The amount of such monomer having peroxy group is not particularly limited, but is preferably from 0.01 to 15 mol %, more preferably from 0.1 to 5 mol %, based on the total number of moles of all the monomers used for preparing the fluorine-containing copolymer. If it is less than 0.01 mol %, the number of the graft copolymerization initiating points may become insufficient. With this, reactivity of the fluorine-containing graft in the graft copolymerization may become too low, and the obtained graft copolymer may become too high in molecular weight and thus may become too low in solvent solubility. If it is greater than 15 mol %, the number of the graft copolymerization initiating point may become excessive. With this, the coated film may become inferior in weather resistance.

In the invention, it is optional to use a monomer having two kinds of polymerizable group, such as allyl methacrylate, in the preparation of the fluorine-containing copolymer, in order to introduce the graft copolymerizable group into the fluorine-containing copolymer. In this case, polymerizable double bond is introduced into the fluorine-containing copolymer by one step of polymerizing the monomers.

In the invention, the fluorine-containing copolymer may be prepared by copolymerizing a monomer mixture having a suitable chemical composition. The polymerization method for preparing the fluorine-containing copolymer is not particularly limited and may be selected from conventional ones such as solution polymerization, bulk polymerization, suspension polymerization, and emulsion polymerization. Of these, solution polymerization is particularly preferable, because the fluorine-containing copolymer is obtained in the form of solute in solution. This solution of the fluorine-containing copolymer is directly usable in the graft copolymerization. Examples of the solvent used in the solution polymerization are water, alcohols, saturated aliphatic hydrocarbons such as n-hexane and n-heptane, aromatic hydrocarbons such as toluene, xylene and ethylbenzene, fluorohydrocarbons such as 1,1-dichloro-1-fluoroethane and 3,3-dichloro-1,1,1,2,2-pentafluoropropane, ketones such as acetone, methyl ethyl ketone and methyl isobutyl ketone, esters such as ethyl acetate and butyl acetate, petroleum solvents such as mineral spirit, mineral terpene and isoparaffin, and mixtures of at least two of these.

Examples of the radical polymerization initiator used in the preparation of the fluorine-containing copolymer are dicarbonates such as diisopropyl peroxydicarbonate, di-n-propyl peroxydicarbonate and di-2-ethylhexyl peroxydicarbonate, diacyl peroxides such as n-heptafluorobutyric peroxide, lauroyl peroxypivalate and t-butyl oxyneodecanoate, alkyl peroxides such as di-t-butyl peroxide and t-butylcumyl peroxide, and peroxy esters such as t-butyl peroxypivalate and t-butyl peroxyneodecanoate. When a monomer having peroxy group is used in the preparation of the fluorine-containing copolymer, it is necessary to choose a radical polymerization initiator which is decomposable at a temperature lower than the decomposition temperature of the peroxy group.

In the invention, the graft copolymerization of the fluorine-containing copolymer with the first monomer composition is conducted, preferably in a manner that the first monomer composition is polymerized at a position of radical derived from the decomposition of peroxy bond. In this graft copolymerization, the first monomer composition is polymerized by solution polymerization in the presence of the fluorine-containing copolymer dissolved in solvent. Therefore, the graft copolymerization can be easily conducted by introducing the first monomer composition into a reaction vessel containing the fluorine-containing copolymer prepared by solution polymerization. Thus, it becomes possible to simplify the method for preparing the graft copolymer, due to solution polymerization. With this, the cost for producing the graft copolymer can be reduced. Furthermore, it is not necessary to add again a polymerization initiator for conducting the graft copolymerization.

When the obtained fluorine-containing copolymer does not have peroxy group, it is preferable to modify the fluorine-containing copolymer in order to introduce polymerizable double bond thereinto. With this, conversion of the fluorine-containing copolymer in the graft copolymerization will increase. This modification is conducted, for example, by reacting the functional group which has previously been introduced into the copolymer with the functional group of a functional monomer having polymerizable double bond. The polymerizable double bond introduced thereinto is preferably positioned at side chains of the fluorine-containing copolymer. The number of the double bond in the molecule is preferably up to 15%, based on the total number of all of the constitutional units of the copolymer.

In the invention, the type of the above-mentioned functional monomer for modifying the fluorine-containing copolymer varies depending on the type of the functional group which has previously been introduced into the copolymer. For example, in case that the fluorine-containing copolymer has hydroxyl group, the functional monomer can be selected from compounds each having isocyanate group. Preferable examples of such functional monomer are isocyanato methacrylate and isocyanatoethyl methacrylate. Furthermore, such functional monomer may be monoisocyanate compounds each having an unsaturated group prepare by reacting an unsaturated alcohol with a diisocyanate compound. When such functional monomer is reacted with the fluorine-containing copolymer having hydroxyl group, urethane bond is formed by the reaction of hydroxyl group with isocyanate group. In case that the fluorine-containing copolymer has epoxy group, the functional monomer can be selected from monomers each having carboxyl group, such as (meth)acrylic acid. When this functional monomer is reacted with the fluorine-containing copolymer having epoxy group, ester bond is formed, thereby to introduce polymerizable double bond thereinto. In case that the fluorine-containing copolymer has carboxyl group, the functional monomer can be selected from monomers each having epoxy group, such as allyl glycidyl ether and glycidyl methacrylate. When this functional monomer is reacted with the fluorine-containing copolymer having carboxyl group, ester bond is formed, thereby to introduce polymerizable double bond thereinto. The above-mentioned modification of the fluorine-containing copolymer can simply be conducted at first by dissolving the fluorine-containing copolymer and the functional monomer in a suitable solvent and then by heating the resultant solution. If this heating is conducted in the presence of a suitable catalyst (e.g., acid or amine compound), it becomes possible to accelerate the reaction.

As stated above, the first monomer composition, which is to be subjected to graft copolymerization with the fluorine-containing copolymer, contains the second monomer, that is, (meth)acrylic ester represented by a general formula of $CH_2=C(-R')C(=O)O-R$ where R is defined as above, and R' is hydrogen atom or methyl group. In the invention, it is preferable to use a (meth)acrylic ester used for producing acrylic resin paints. Examples of the (meth)acrylic ester suited to the invention are methyl acrylate, ethyl acrylate, butyl acrylate, isobutyl acrylate, ter-butyl acrylate, cyclohexyl acrylate, ethylhexyl acrylate, n-octyl acrylate, isooctyl acrylate, nonyl acrylate, tridecyl acrylate, lauryl acrylate, benzyl acrylate, isobornyl acrylate, methyl methacrylate, ethyl methacrylate, butyl methacrylate, isobutyl methacrylate, ter-butyl methacrylate, cyclohexyl methacrylate, ethylhexyl methacrylate, n-octyl methacrylate, isooctyl methacrylate, nonyl methacrylate, tridecyl methacrylate, lauryl methacrylate, benzyl methacrylate, and isobornyl methacrylate.

In the invention, the (meth)acrylic ester may contain a functional group (i.e., hydroxyl group, epoxy group, amino group or alkoxysily group) which becomes the cross-linking sites. Examples of such (meth)acrylic ester are hydroxymethyl (meth)acrylate, hydroxyethyl (meth)acrylate, hydroxypropyl (meth)acrylate, hydroxybutyl (meth)acrylate, and (meth)acrylic esters of polyhydric alcohol, such as polyethylene glycol mono(meth)acrylate, polypropylene glycol mono(meth)acrylate, poly(ethylene glycol-propylene glycol) mono(meth)acrylate, polytetramethylene glycol mono(meth)acrylate and glycerol mono(meth)acrylate. Examples of the (meth)acrylic ester having amino group in the molecule are aminoethyl (meth)acrylate, N-methylaminoethyl (meth)acrylate, N,N-dimethylaminoethyl (meth)acrylate, N,N-diethylaminoethyl (meth)acrylate, N,N-methylethylaminoethyl (meth)acrylate, N,N-dipropylaminoethyl (meth)acrylate, N,N-dimethylaminopropyl (meth)acrylate, N,N-diethylaminopropyl (meth)acrylate, and N,N-diethylaminohexyl (meth)acrylate. Examples of the (meth) acrylic ester having alkoxysilyl group are γ-methacryloxypropyltrimethoxysilane, γ-methacryloxypropylmethyldimethoxysilane, and methacryloxymethyltrimethoxysilane. An example of the (meth) acrylic ester having epoxy group is glycidyl (meth)acrylate.

In the invention, the first monomer composition, which is to be subjected to graft copolymerization with the fluorine-containing copolymer, may further contain at least one polymerizable monomer, such as acrylonitrile, aromatic vinyl compound s(e.g., styrene), and olefins (e.g., ethylene, propylene, and butene). The first monomer composition may still further contain at least one polymerizable monomer, such as fluororesin, carboxylic acid vinyl esters, vinyl ether compounds, hydroxyl-containing allyl ether compounds, and hydroxyl-containing vinyl ether compounds.

A fluorine-containing graft copolymer of the present invention is prepared by graft copolymerization of the first monomer composition, which is in an amount of preferably from 1 to 200 parts by weight, with 100 parts by weight of the fluorine-containing copolymer. If it is less than 1 part by weight, the graft copolymer may become inferior in compatibility with the vinylidene fluoride polymer. Therefore, the coated film may become insufficient in gloss and may not have good results in bending test. If it is greater than 200 parts by weight, the coated film become inferior in weather resistance.

In the invention, the manner of graft copolymerization on the first monomer composition with the fluorine-containing copolymer is not particularly limited. As stated above, the graft copolymerization is conducted preferably by solution polymerization of the first monomer composition dissolved in a solvent, in the presence of the fluorine-containing copolymer dissolved in the solvent. When the fluorine-containing copolymer contains peroxy groups, the graft copolymerization can be conducted by using peroxy groups as the polymerization initiating points, without newly adding a polymerization initiator. In contrast, when it does not contain peroxy group, the graft copolymerization can be conducted by newly adding a polymerization initiator, in a manner analogous to that of conventional polymerization methods. As is seen in common graft copolymerizations, the product of the graft copolymerization contains a polymer of the first monomer composition, in addition to the fluorine-containing graft copolymer. The form of this polymer varies, depending on the amount of peroxy bond, the amount of polymerizable double bond, the kinds of the monomers, the kind of the polymerization initiator, and other polymerization conditions. It is not necessary to remove this polymer from the graft copolymerization product, in order to produce a pain from this product.

In case that a paint curable at ambient temperature is produced by adding a hardener to the fluorine-containing graft copolymer, it is preferable that this graft copolymer has a hydroxyl value of from 10 to 180 mg KOH/g. If it is less than 10 mg KOH/g, the number of the cross-liking sites of the graft copolymer may become insufficient. With this, the coated film may become inferior in weather resistance. If it is greater than 180 mg KOH/g, the amount of hardener necessary to cure the pain becomes too much. With this, the coated film may become insufficient in weather resistance. It is preferable that the graft copolymer has an acid value of from 0.1 to 80 mg KOH/g. If it is less than 0.1 mg KOH/g, the pigment dispersibility and the degree of cross-link may become too low. If it is greater than 80 mg KOH/g, the coated film may become inferior in water resistance. In connection with the hydroxyl and acid values of the graft copolymer, hydroxyl and carboxyl groups may be contained in one of the fluorine-containing copolymer and the first monomer composition or in both of them.

In the invention, the number average molecular weight (polystyrene as a standard material) of the fluorine-containing copolymer is preferably from 1,000 to 30,000, more preferably from 3,000 to 15,000. If it is less than 1,000, the coated film formed from a graft polymer prepared from the fluorine-containing copolymer may become inferior in weather resistance and softness. If it is greater than 30,000, the fluorine-containing copolymer may become too low in solvent-solubility to conduct solution copolymerization. In the invention, the number average molecular weight (polystyrene as a standard material) of the fluorine-containing graft copolymer is preferably from 2,000 to 200,000. If it is less than 2,000, the coated film may become inferior in weather resistance and softness. If it is greater than 200,000, it may become difficult to conduct graft copolymerization. In case that the graft copolymer is used as a curable paint, the molecular weight of the fluorine-containing graft copolymer is not particularly limited, but is preferable to be variable within a range of from 2,000 to 50,000, depending on the required strength and softness of the coated film. If it is lower than 2,000, the coated film may become too low in weather resistance and softness. If it is greater than 50,000, the coating composition may become too high in viscosity or too low in solvent solubility. The molecular weight of the graft copolymer is preferably from 5,000 to 100,000, in case that a paint is prepared by mixing the graft copolymer, a vinylidene fluoride resin, and its latent solvent.

In the invention, the vinylidene fluoride polymer to be mixed with the fluorine-containing graft copolymer contains at least about 75% of a main constitutional unit derived from vinylidene fluoride, based on the total number of all the constitutional units of the vinylidene fluoride polymer. The vinylidene fluoride polymer varies in structure, molecular weight and other related characteristics, depending on the polymerization conditions. Preferable examples of the vinylidene fluoride polymer are homopolymer of vinylidene fluoride, and copolymers of vinylidene fluoride and at least one other monomer, which are used for preparing baking paints. Nonlimitative examples of this homopolymer are HYLER 5000 (trade name) of Ausimont Co. and KINER 500 (trade name) of Elf Atochem Co. The at least one other monomer to be copolymerized with vinylidene fluoride may be selected from vinyl fluoride, trifluoroethylene, chlorotrifluoroethylene, tetrafluoroethylene, hexafluoropropylene, hexafluoroisobutene, hexafluoroacetone, and the like.

In order to prepare a fluorine-containing coating composition for a baking paint, 100 parts by weight of the vinylidene fluoride polymer is mixed with the fluorine-containing graft copolymer which is in an amount of from about 0.1 to about 1,000 parts by weight, preferably from about 1 to about 200 parts by weight. If the amount of the fluorine-containing graft copolymer is greater than 1,000 parts by weight, the coated film does not sufficiently show good weather resistance and good chemical resistance, which are derived from the vinylidene fluoride polymer. If it is less than 0.1 parts by weight, the coated film does not show high gloss derived from the fluorine-containing graft copolymer.

In the invention, the coating composition for producing a baking paint may further comprise a (meth)acrylic resin, in addition to the fluorine-containing graft copolymer, the vinylidene fluoride polymer, and an organic solvent. This (meth)acrylic resin can be prepared by polymerizing the above-mentioned first monomer composition for preparing the fluorine-containing graft copolymer, using a conventional polymerization method. The (meth)acrylic resin is not particularly limited in composition. It is preferable that the (meth)acrylic resin contains at least 40 mol % of methyl methacrylate, from the view point of compatibility of the (meth)acrylic resin with the other components of the coating composition. As such (meth)acrylic resin, it is possible to choose a commercial acrylic resin for preparing a baking paint. which has a suitable composition. The (meth)acrylic resin is in an amount of preferably up to 200 parts by weight, more preferably up to 150 parts by weight, per 100 parts by weight of the fluorine-containing graft copolymer. If it is greater than 200 parts by weight, the coated film may become inferior in weather resistance.

In the invention, a fluorine-containing coating composition for preparing the above-mentioned baking paint is prepared by mixing an organic solvent with the other components. As this solvent, the latent solvent of the polyvinylidene fluoride is used. Examples of this solvent for preparing the coating composition are methyl isobutyl ketone, butyl acetate, cyclohexanone, diacetone alcohol, diisobutyl ketone, butyrolactone, tetraethylurea, isophorone, triethyl phosphate, carbitol acetate, propylene carbonate, and dimethyl phthalate. Furthermore, there can be used, as this solvent, a mixture of solvent and non-solvent of polyvinylidene fluoride. Examples of the solvent of polyvinylidene fluoride are acetone, tetrahydrofuran, methyl ethyl ketone, dimethylformamide, dimethylacetoamide, tetramethylurea, and trimethylphosphate. Example of the non-solvent of polyvinylidene fluoride are pentane, methanol, hexane, benzene, isopropyl alcohol, ethanol, xylene, toluene and decane.

In the invention, in case that the graft copolymer is used as a curable paint, the solvent is not limited, but a conventional solvent exemplified as a solvent or non-solvent of the baking paint is suited, moreover, toluene, xylene or ethylbenzene is preferable.

In the invention, a curable fluorine-containing paint can be prepared by mixing a fluorine-containing graft copolymer of the present invention with a hardener (e.g., polyisocyanate, blocked isocyanate, melamine resin, amino resin, and silanol condensation catalyst. A paint prepared by adding the hardener is capable of providing a coated film having strength and superior weather resistance. Polyisocyanate used as the hardener is not particularly limited. Examples of this polyisocyanate are ethylene diisocyanate, tetramethylene diisocyanate, hexamethylene diisocyanate (HDI), dodecamethylene diisocyanate, 1,6,11-undecane triisocyanate, 2,2,4-trimethylhexane diisocyanate, 2,6-diisocyanate methylcaproate (LDI), bis(2-isocyanate ethyl) fumarate, bis(2-isocyanate ethyl) carbonate, 2-isocyanateethyl-2,6-diisocyanate hexanoate, isophorone diisocyanate (MDI), dicyclohexylmethane diisocyanate (hydrogenated MDI or HMDI), cyclohexylene diisocyanate, methylcyclohexylene diisocyanate (hydrogenated TDI), bis(2-isocyanateethyl)-4-cyclohexene-1,2-dicarboxylate, xylylene diisocyanate (XDI), dimethylbenzene isocyanate, and tolylene diisocyanate (TDI). Further examples of the polyisocyanate are urethane adducts, biuret compounds, isocyanurates, blocked isocyanates and urethane prepolymers, which are prepared by using the above examples of the polyisocyanate, such as water-modified HDI, TDI dimer, TDI-trimethylol-propane (TMP) adduct (L), HMDI-biuret compound, blocked L-phenol compound, IPDI trimer, and mixtures of at least two of these examples.

With respect to the selection of the polyisocyanate, when the discoloration of the coated film is unfavorable, polyisocyanates of which isocyanate group is not positioned adjacent to the benzene nucleus are preferably used. Examples of these polyisocyanates are aliphatic diisocyanates such as HDI, XDI and LDI, alicyclic isocyanates such as IPDI, hydrogenated MDI and hydrogenated XDI. Furthermore, urethane adducts, biuret compounds, isocyanurates, blocked isocyanates and urethane prepolymers, which are prepared by using these examples of the polyisocyanate, can also preferably be used. Nonlimitative exemplary commercial products of the polyisocyanate are TP-100 and TP-703 of Nippon Polyurethane Kogyo Co., TPLS2071 of Sumitomo Bayer Urethane Co., and DURANATE TSA-100 and DURARATE TPA-100 of ASAHI CHEMICAL INDUSTRY CO., LTD.

Nonlimitative examples of the melamine resin used as a hardener for preparing a fluorine-containing curable paint are particular condensates and etherification products prepared by etherifying at least a portion of these condensates with alcohol. These condensates are prepared by reacting amino-group-containing compounds (e.g., melamine, urea, acetoguanamine, benzoguanamine, steroguanamine and spiroguanamine) with aldehydes (e.g., formaldehyde, paraformaldehyde, acetoaldehyde and glyoxazol), using common methods. Nonlimitative examples of the amino resin used as the hardener are hexamethylated methylol melamine, hexabutylated methylol melamine, methylbutylated methylol melamine, methylated methylol melamine, butylated methylol melamine, isobutylated methylol melamine, and condensates catalyst having an alkoxysilyl group, used as the hardener, are carboxylic tin compounds (e.g., dibutyltin dilaurate, tin dioctylate and dibutyltin maleate), sulfur-containing organic tin compounds such as sulfide compound or mercaptide compound (e.g., dibutyltin sulfide and dibutyltin dioctylmercaptide), acid phosphoric esters such as monomethyl acid phosphoric esters, carboxylic acids (e.g., adipic acid, maleic acid and citric acid), amino-group containing compounds (e.g., γ-aminopropyltriethoxysilane and triethylamine), and organic titanate compounds such as isopropyltriisostearoyl titanate.

Similar to common resins, a fluorine-containing coating composition of the present invention can be processed into a paint, by optionally adding pigment and dye to the coating composition. Furthermore, it is optional to add at least one other additive to the paint, such as ultraviolet absorbing agent, light stabilizer, dispersion stabilizing agent, rust preventive agent, antifungus agent, and levelling agent. Still furthermore, it is optional to add at least one other resin to the paint, such as fluorine-containing polyols, alkoxysilane-containing fluororesins, acrylic silicones, acrylic polyols, polyvinyl esters, silicone compounds, polyalkylene glycols, alkyd resins, and the like.

The following nonlimitative examples are illustrative of the present invention.

EXAMPLE 1

In this example, a baking paint was prepared from a fluorine-containing copolymer of the present invention, Copolymer 1, as follows. At first, Copolymer 1, was prepared as follows. A 3.4-liter stainless steel autoclave provided with an electromagnetic stirrer was charged with 212 g (28 mol %) of vinyl acetate, 243 g (15 mol %) of neononanoic acid ethenyl ester, 32 g (3.5 mol %) of ethylene glycol monoallyl ether, 10 g (1 mol %) of t-butylperoxyallyl carbonate, 8 g (0.5 mol %) of undecylenic acid, 5 g of t-butylperoxy pivalate, and 10 g of sellaite. The gas atmosphere in the autoclave was replaced by nitrogen gas, and this operation was repeated three times. Then, 533 g (52 mol %) of chlorotrifluoroethylene and 385 g of xylene were introduced into the autoclave. The more percentage of each of the above monomers is based on the total number of moles of all the monomers used for preparing the fluorine-containing copolymer. The temperature in the autoclave was gradually raised up to 55° C., and at this temperature polymerization reaction was carried out for 18 hr, thereby to obtain the fluorine-containing copolymer, Copolymer 1.

Then, a fluorine-containing graft copolymer of the present invention, Graft Copolymer A, was prepared by using Copolymer 1, as follows. The reaction liquid containing Copolymer 1 was taken out of the autoclave. The reaction liquid was filtered to obtain a solution containing 910 g of Copolymer 1 dissolved in xylene. Then, this xylene solution was mixed, per 300 g of the solid matter contained in the xylene solution, with 220 g of methyl methacrylate, 70 g of cyclohexyl methacrylate, 10 g of hydroxyethyl methacrylate, 0.01 g of t-dodecylmercaptane, and xylene in an amount to adjust the total weight of xylene to 600 g, in a 2.0-liter stainless steel autoclave provided with an electromagnetic stirrer. The temperature in this autoclave was gradually raised up to 100° C., and at this temperature graft copolymerization was carried out for 8 hr., thereby to obtain Graft Copolymer A. The reaction liquid was taken out of the autoclave, and then the reaction liquid was filtered. Then, the solid matter concentration of the reaction liquid was adjusted to 50%, thereby to obtain a transparent varnish of Graft Copolymer A. This graft copolymer has a hydroxyl value of 15 mg KOH/g, an acid value of 2.0 mg KOH/g, and a number average molecular weight (polystyrene as a standard material) of 19,000.

Then, a white enamel paint was prepared by using Graft Copolymer A, as follows. As shown in Table 1, the obtained varnish containing Graft Copolymer A was mixed, per 100 parts by weight of the solid matter contained in the varnish, with 120 parts by weight of polyvinylidene fluoride (HYLAR 5000 (trade name) of AUSIMONT Co.), 40 parts by weight of an acrylic resin (PARALOYD B44 (trade name) of Rohm & Haas Co.), 130 parts by weight of titanium oxide (CR90 (trade name) of ISHIHARA SANGYO KAISHA, LTD., 100 parts by weight of xylene, and 290 parts by weight of isophorone. Then, the mixture was stirred to disperse the components, thereby to obtain a white enamel paint.

Then, the obtained white enamel paint was applied to an aluminum plate having a thickness of 0.8 mm, by using a bar coater. The coated film formed on the aluminum plate was baked at 270° C., for 2 min, thereby to obtain a white coated film having a thickness of about 40 $\mu$m. The coated film was subjected to the following evaluation tests, and the results of the evaluation tests are shown in Table 1. The surface gloss of the coated film at 60 degrees was measured. A weathering test was conducted by accelerated testing with a sunshine weathermeter for 5,000 hr, and then the surface gloss of the coated film at 60 degrees was measured after the weathering test, thereby to indicate the degree of weatherability (weather resistance) by percentage of retained floss. A bending test was conducted on the coated aluminum plate, after heating the name at 80° C. for seven days. The bending test was conducted in accordance with Japanese Industrial Standard (JIS) G 3312, of which disclosure is incorporated herein by reference in its entirety. In this test, at least one aluminum plate having a thickness of 0.8 mm was placed on the uncoated side of the coated aluminum plate, thereby to prepare a laminate. In other words, the at least one aluminum plate was not bonded to the coated aluminum plate. Then, the laminate was bent in a manner to expose the coated film to the outer position. The minimum number of the at least one aluminum plate of the laminate, which did not cause the coated film to have cracks thereon in the bending test, was recorded as the result of this test. In other words, for example, when the coated film had no cracks thereon by bending a laminate having three aluminum plates placed on the coated aluminum plate, but had cracks thereon by bending the same having two aluminum plates placed thereon "3T" to indicate the number of three was recorded as the result of this test, as shown in Table 1. Thus, the results of the bending test of Table 1 can be arranged in the order of 0T>1T>3T>4T where it means that, for example, 1T is interior to 0T.

TABLE 1

| | Ex. 1 | Ex. 2 | Ex. 3 | Ex. 4 | Ex. 5 | Com. Ex. 1 | Com. Ex. 2 | Com. Ex. 3 |
|---|---|---|---|---|---|---|---|---|
| Paint Composition (parts by weight) | | | | | | | | |
| Graft Copolymer A | 100 | 100 | — | — | — | — | — | — |
| Graft Copolymer B | — | — | 100 | — | — | — | — | — |
| Graft Copolymer C | — | — | — | 100 | — | — | — | — |
| Graft Copolymer D | — | — | — | — | 100 | — | — | — |
| Copolymer 1 | — | — | — | — | — | — | 100 | — |
| Copolymer 3 | — | — | — | — | — | — | — | 100 |
| PVDF | 120 | 10 | 480 | 120 | 60 | 100 | 120 | 120 |
| Acrylic Resin | 40 | — | 100 | 40 | — | 43 | 40 | 40 |
| Isophorone | 290 | 100 | 250 | 290 | 190 | 180 | 290 | 290 |
| Xylene | 100 | 60 | 100 | 100 | 50 | 30 | 100 | 100 |
| TiO$_2$ | 130 | 55 | 120 | 130 | 50 | 70 | 130 | 130 |
| Coated Film Characteristics | | | | | | | | |
| Thickness ($\mu$m) | 40 | 38 | 41 | 40 | 35 | 40 | 39 | 42 |
| Gloss at 60° | 72 | 80 | 78 | 66 | 69 | 38 | 14 | 8 |
| Weather Resistance (%) | 98 | 94 | 99 | 99 | 95 | 99 | 98 | 38 |
| Bending Test | 0T | 0T | 1T | 1T | 0T | 3T | 4T | 4T |

EXAMPLE 2

In this example, Example 1 was repeated except in that a white enamel paint was prepared by omitting the acrylic resin and by changing the amount of the other components of the white enamel paint, as shown in Table 1.

EXAMPLE 3

In this example, Example 1 was repeated except in that a white enamel paint was prepared by using the following fluorine-containing graft copolymer, Graft Copolymer B, in place of Graft Copolymer A, and by changing the amounts of the other components of the white enamel paint, as shown in Table 1.

In this example, Graft Copolymer B was prepared as follows. At first, a fluorine-containing copolymer of the present invention, Copolymer 2, was prepared as follows. A 3.4-liter stainless steel autoclave provided with an electromagnetic stirrer was charged with 212 g (28 mol %) of vinyl acetate, 316 g (19.5 mol %) of neononanoic acid ethenyl ester, 20 g (2 mol %) of t-butylperoxyallyl carbonate, 8 g (0.5 mol %) of undecylenic acid, 5 g of t-butylperoxy pivalate, and 10 g of sellaite. The gas atmosphere in the autoclave was replaced by nitrogen gas, and this operation was repeated three times. Then 533 g (52 mol %) of chlorotrifluoroethylene and 385 g of xylene were introduced into the autoclave. Then, the polymerization reaction was carried out in the same manner as that of Example 1, thereby to obtain the fluorine-containing copolymer, Copolymer 2.

The, Graft Copolymer B, was prepared by using Copolymer 2, as follows. The reaction liquid containing Copolymer 2 was taken out of the autoclave. The reaction liquid was filtered to obtain a solution containing 925 g of Copolymer 2 dissolved in xylene. Then, this xylene solution was mixed, per 180 g of the solid matter contained in the xylene solution, with 220 g of methyl methacrylate, 70 g of cyclohexyl methacrylate, 10 g of butyl methacrylate, 0.01 g of t-dodecylmercaptane, and xylene in an amount to adjust the total weight of xylene to 480 g, in a 2.0-liter stainless steel autoclave provided with an electromagnetic stirrer. Then, the graft copolymerization was carried in the same manner as that of Example 1, thereby to obtain Graft Copolymer B. Then, a transparent varnish of Graft Copolymer B was prepared in the same manner as that of Example 1. This graft copolymer had a an acid value of 1.6 mg KOH/g, and a number average molecular weight (polystyrene as a standard material) of 22,000. As mentioned above, this graft copolymer was prepared in a manner that the graft copolymer was substantially free of hydroxyl group, except that contained in carboxyl group.

EXAMPLE 4

In this example, Example 1 was repeated except in that a white enamel paint was prepared by using the following fluorine-containing graft copolymer, Graft Copolymer C, in place of Graft Copolymer A Graft Copolymer C was prepared as follows. At first, a fluorine-containing copolymer of the present invention, Copolymer 3, was prepared as follows. A 3.4-liter stainless steel autoclave provided with an electromagnetic stirrer was charged with 177 g (28 mol %) of ethyl vinyl ether, 206 g (19.5 mol %) of cyclohexyl vinyl ether, 20 g (2 mol %) of t-butylperoxyallyl carbonate, 8 g (0.5 mol %) of undecylenic acid, 5 g of t-butylperoxy pivalate, and 10 g of sellaite. The gas atmosphere in the autoclave was replaced by nitrogen gas, and this operation was repeated three times. Then, 510 g (50 mol %) of chlorotrifluoroethylene and 420 g of xylene were introduced into the autoclave. Then, the polymerization reaction was carried out in the same manner as that of Example 1, thereby to obtain the fluorine-containing copolymer, Copolymer 3.

Then, Graft Copolymer C, was prepared by using Copolymer 3, as follows. The reaction liquid containing Copolymer 3 was taken out of the autoclave. The reaction liquid was filtered to obtain a solution containing 915 g of Copolymer 3 dissolved in xylene. Then, this xylene solution was mixed, per 300 g of the solid matter contained in the xylene solution, with 220 g of methyl methacrylate, 70 g of cyclohexyl methacrylate, 10 g of hydroxyethyl methacrylate, 0.01 g of t-dodecylmercaptane, and xylene in an amount to adjust the total weight of xylene to 600 g, in a 2.0-liter stainless steel autoclave provided with an electromagnetic stirrer. Then, the graft copolymerization was carried in the same manner as that of Example 1, thereby to obtain Graft Copolymer C. Then, a transparent varnish of Graft Copolymer C was prepared in the same manner as that of Example 1. This graft copolymer had a hydroxyl value of 10.0 mg KOH/g, an acid value of 1.7 mg KOH/g, and a number average molecular weight (polystyrene is a standard material) of 16,000.

EXAMPLE 5

In this example, Example 1 was repeated except in that a white enamel paint was prepared by using the following fluorine-containing graft copolymer, Graft Copolymer D, in place of Graft Copolymer A, by omitting the copolymer of methacrylic acid ester, and by changing the amounts of the other components of the white enamel paint, as shown in Table 1.

In this example, Graft Copolymer D was prepared as follows. At first, a fluorine-containing copolymer of the present invention, Copolymer 4, was prepared as follows. A 3.4-liter stainless steel autoclave provided with an electromagnetic stirrer was charged with 212 g (28 mol %) of vinyl acetate, 243 g (15 mol %) of neononanoic acid ethenyl ester, 34 g (4.5 mol %) of ethylene glycol monoallyl ether, 8 g (0.5 mol %) of undecylenic acid, 5 g of t-butylperoxy pivalate, and 10 g of sellaite. The gas atmosphere in the autoclave was replaced by nitrogen gas, and this operation was repeated three times. Then, 533 g (52 mol %) of chlorotrifluoroethylene and 385 g of xylene were introduced into the autoclave. Then, the polymerization reaction was carried out in the same manner as that of Example 1, thereby to obtain the fluorine-containing copolymer, Copolymer 4.

Then, Graft, Copolymer D, was prepared by using Copolymer 4, as follows. The reaction liquid containing Copolymer 4 was taken out of the autoclave. The reaction liquid was filtered to obtain a solution containing 910 g of Copolymer 4 dissolved in xylene. Then, a 2.0-liter stainless steel autoclave provided with an electromagnetic stirrer was charged with the xylene solution containing 300 g of Copolymer 4. Then, xylene was added to this autoclave to adjust total weight of xylene to 300 g, followed by the addition of 14 g of isocyanate ethylmethacrylate. After removing the gas atmosphere, the temperature in this autoclave was gradually raised up to 80° C., and at this temperature stirring was conducted for 7 hr to introduce polymerizable double bond to Copolymer 4. Then, the autoclave was further charged with 220 g of methyl methacrylate, 70 g of cyclohexyl methacrylate, 10 g of hydroxyethyl methacrylate, 0.1 g of t-dodecylmercaptan, and 300 g of xylene. Then, the graft copolymerization was carried in the same manner as that of Example 1, thereby to obtain Graft Copolymer D. Then, a transparent varnish of Graft Copolymer D was prepared in the same manner as that of Example 1. This graft copolymer had a hydroxyl value of 7 mg KOH/g, an acid value of 1.0 mg KOH/g, and a number average molecular weight (polystyrene as a standard material) of 18,000.

COMPARATIVE EXAMPLE 1

In this example, Example 1 was repeated except in that a white enamel paint was prepared by omitting Graft Copolymer A and by changing the amounts of the other components of the enamel paint, as shown in Table 1.

COMPARATIVE EXAMPLE 2

In this example, Example 1 was repeated except in that a white enamel paint was prepared by using Copolymer 1 of Example 1, in place of Graft Copolymer A, as shown in Table 1.

COMPARATIVE EXAMPLE 3

In this example, Example 1 was repeated excepted in that a white enamel paint was prepared by using Copolymer 3 of Example 4, in place of Graft Copolymer A, as shown in Table 1.

EXAMPLE 6

In this example, a curable paint was prepared from a fluorine-containing copolymer of the present invention, Copolymer 5, as follows. At first, Copolymer 5, was prepared as follows. A 3.5-liter stainless steel autoclave provided with an electromagnetic stirrer was charged, as shown in Table 2, with 193 g (25 mol %) of vinyl pivalate (VPv), 88 g (8 mol %) of neononanoic acid ethenyl ester (V9), 92 g (15 mol %) of ethylene glycol monoallyl ether (EGMAE), 10 g (1 mol %) of t-butylperoxyallyl carbonate (BPAC), 11 g (1 mol %) of undecylenic acid (UA), 5 g of t-butylperoxy pivalate, and 10 g of sellaite. The gas atmosphere in the autoclave was replaced by nitrogen gas, and this operation was repeated three times. Then, 350 (50 mol %) of chlorotrifluoroethylene (CTFE) was introduced into the autoclave. The mole percentage of each of the above monomers is based on the total number of moles of all the monomers used for preparing the fluorine-containing copolymer. The temperature in the autoclave was gradually raised up to 55° C., and at this temperature polymerization reaction was carried out for 18 hr, thereby to obtain the fluorine-containing copolymer, Copolymer 5. This copolymer had a number average molecular weight, as shown in Table 2. Then, the gas atmosphere containing the unreacted monomers was removed from the autoclave, and then 225 g of methyl methacrylate (MMA), 33 g of hydroxyethyl methacrylate (HEMA), and 400 g of xylene were added to the autoclave, under reduced pressure. Then, the temperature in the autoclave was gradually raised up to 100° C., and at this temperature graft copolymerization was carried out for 6 hr, thereby to obtain a fluorine-containing graft copolymer, Graft Copolymer E. The reaction liquid was taken out of the autoclave, and then the reaction liquid was filtered. Then, the solid matter concentration of the reaction liquid was adjusted to 55%, thereby to obtain a varnish of Graft Copolymer E. This varnish was transparent, as evaluated as "A" in Table 2. The grafting degree of this graft copolymer, which is shown in Table 2, is defined as the percentage by weight of the total of all the monomers used in the graft copolymerization, based on the total weight of the fluorine-containing copolymer. This graft copolymer had a number average molecular weight (polystyrene as a standard material) and hydroxyl and acid values, as shown in Table 2.

TABLE 2

| | Ex. 6 | Ex. 7 | Ex. 8 | Ex. 9 | Ex. 10 |
|---|---|---|---|---|---|
| Charged Monomers for Copolymer (g) | | | | | |
| CTFE | 350 | 350 | 300 | 250 | 350 |
| TFE* | — | — | 60 | — | — |
| BPAC | 10 | 20 | 10 | 28 | 20 |
| VPv | 193 | 170 | 150 | 140 | 216 |
| V9 | 88 | — | 88 | 40 | 198 |
| EVE* | — | 50 | — | — | — |
| CHVE* | — | 60 | — | — | — |
| AAA* | — | 20 | — | — | — |
| ε-CAE* | — | — | 30 | — | — |
| GMAE* | — | 10 | 5 | 5 | — |
| HBVE* | — | 90 | 169 | — | — |
| EGMAE | 92 | — | — | 70 | 9 |
| UA | 11 | 5 | 5 | 10 | 1.5 |
| Copolymer Mol. Wt. (Mn) | 12,000 | 6,050 | 5,500 | 9,600 | 8,500 |
| Charged Monomers for Graft Copolymer (g) | | | | | |
| MMA | 225 | 150 | 300 | 750 | 250 |
| CHMA* | — | — | 200 | 200 | 250 |
| HEMA | 33 | — | 50 | 100 | — |
| MTMS* | — | — | — | — | 100 |
| Xylene (wt %) | 700 | 700 | 750 | 1,000 | 800 |
| Grafting Degree (wt %) | 37 | 21 | 70 | 182 | 50 |
| Graft Copolymer Characteristics | | | | | |
| Mol. Weight (Mn) | 27,000 | 16,000 | 18,000 | 39,000 | 14,000 |
| Varnish Transparency | A | A | A | A | A |
| OH Value (mg KOH/g) | 56 | 80 | 154 | 70 | 4.2 |
| Acid Value (mg KOH/g) | 4.0 | 2.1 | 2.3 | 6.5 | 0.5 |

*TFE: tetrafluoroethylene, EVE: ethyl vinyl ether, CHVE: cyclohexyl vinyl ether, AAA: allyl acetoacetate, ε-CAE: ε-caprolactone-modified monoallyl ether, GMAE: glycerol monoallyl ether, HBVE: hydroxybutyl vinyl ether, CHMA: cyclohexyl methacrylate, and MTMS: γ-methacryloxypropyl-trimethoxysilane.

The above varnish of Graft Copolymer E, per 100 parts by weight of the solid matter contained in the varnish, was mixed with 100 parts of weight of titanium oxide (CR90 (trade name) of ISHIHARA SANGYO KAISHA, LTD.). Then, this mixture was stirred to disperse these components. Then, 18 parts by weight of hexamethylene diisocyanate terpolymer (HMDI), TPA 100 (trade name) of ASAHI CHEMICAL INDUSTRY CO., LTD., was added thereto, to prepare a white enamel paint.

The obtained paint was respectively applied by spraying to an aluminum plate, a fluororesin coated film (1st film), an polyurethane coated film (2nd film), an acrylic silicone resin coated film (3rd film), a polyvinylidene fluoride (PVDF) coated film (4th film), and an alkyd resin coated film (5th film), thereby to form a coated film on each of these substrates, followed by the cure of each coated film at room temperature for 7 days. The thickness of the coated film formed on each substrate was about 43 μm. The fluororesin film was prepared by applying a fluororesin paint, CEFRAL COAT A202B (trade name) of Central Glass Company Limited, to an aluminum plate. The polyurethane film was prepared by applying an acrylic polyol and an isocyanate compound, A801 (trade name) of DAINIPPON INK AND CHEMICAL, INC., to an aluminum plate. The acrylic silicone resin film was prepared by applying an acrylic silicone resin paint, ARES SILICONE (trade name) of KANSAI PAINT CO., LTD. The PVDF film was prepared by applying a PVDF baking paint, KINER (trade name) of Elf Atochem Co., to an aluminum plate. The alkyd resin film was prepared by applying an alkyd resin paint of HARIMA CHEMICAL INC.

The coated film formed on each substrate was subjected to the following evaluation tests. The results of these tests are shown in Table 3.

The weather resistance test was conducted on the coated film formed on the aluminum plate by accelerated testing with sunshine weathermeter for 5,000 hr, and the surface gloss of this coated film at 60 degrees was measured before and after the weather resistance test to indicate the degree of weather resistance by percentage of the retained gloss.

The pencil hardness test was conducted on the coated film formed on the aluminum plate, in accordance with JIS K 5400 of which disclosure is incorporated herein by reference in its entirety.

In the color difference determination test, the color of the coated film formed on the aluminum plate was measured before and after an outdoor exposure test for six months in accordance with JIS Z8730 of which disclosure is incorporated herein by reference in its entirety. This outdoor exposure test was conducted in Kawagoe City, Saitama Prefecture, Japan.

In the water resistance test, the test samples having the coated films formed on the substrates (the 1st to 5th films) were boiled in boiling water for 5 hr. Then, a coin was scratched against each of the coated films thereon, to judge the degree of adhesion of these coated films to the substrates. As to the results shown in Table 3, "A" means that the coated film did not exfoliate at all from the substrate, after the coin scratch test, "B" means that it exfoliated from the substrate by the coin scratch test, and "C" means that it had blisters by the boiling test or exfoliated from the substrate by this test.

TABLE 3

|  | Ex. 6 | Ex. 7 | Ex. 8 | Ex. 9 | Ex. 10 | Com. Ex. 4 | Com. Ex. 5 | Com. Ex. 6 | Com. Ex. 7 |
|---|---|---|---|---|---|---|---|---|---|
| Paint Comp. (parts by weight) | | | | | | | | | |
| Graft Copolymer E | 100 | — | — | — | — | — | — | — | — |
| Graft Copolymer F | — | 100 | — | — | — | — | — | — | — |
| Graft Copolymer G | — | — | 100 | — | — | — | — | — | — |
| Graft Copolymer H | — | — | — | 100 | — | — | — | — | — |
| Graft Copolymer I | — | — | — | — | 100 | — | — | — | — |
| Graft Copolymer J | — | — | — | — | — | 100 | — | — | — |
| Graft Copolymer K | — | — | — | — | — | — | 100 | — | — |
| Graft Copolymer L | — | — | — | — | — | — | — | 100 | — |
| Copolymer 13 | — | — | — | — | — | — | — | — | 100 |
| HMDI (Hardener) | 18 | 27 | 49 | 23 | — | 19 | — | 25 | 32 |
| DBTDL (Hardener) | — | — | — | — | 1 | — | — | — | — |
| Coated Film Characteristics | | | | | | | | | |
| Weather Res. (%) | 98 | 99 | 98 | 99 | 98 | 37 | 10 | 24 | 98 |
| Pencil Hardness | 3H | 2H | 2H | 2H | 4H | H | 2H | 3H | F |
| Color Dif. (ΔE) | 3.7 | 2.1 | 2.5 | 2.4 | 2.0 | 12.0 | 11.5 | 3.6 | 13.6 |
| Adhesion to 1st to 5th Films | | | | | | | | | |
| 1st Film | A | A | A | A | A | C | B | B | A |
| 2nd Film | A | A | A | A | A | B | A | A | B |
| 3rd Film | A | A | A | A | A | B | C | B | B |
| 4th Film | A | A | A | A | C | C | A | B | C |
| 5th Film | A | A | A | A | A | B | B | A | C |

EXAMPLES 7–10

In these examples, the fluorine-containing copolymers, Copolymers 6–9, were respectively prepared in accordance with Example 6 except in that selective changes were made as shown in Table 2 in the kind and quantity of monomers for preparing Copolymers 6–9. Then, the fluorine-containing graft copolymers, Graft Copolymers F–I, were respectively prepared in these examples in accordance with Example 6 except in that selective changes were made as shown in Table 2 in the kind and quantity of monomers for preparing graft Copolymers F–I. Then, white enamel paints were prepared in these examples in accordance with Example 6 except in that Graft Copolymers F–I were used in place of Graft Copolymer E, and that selective changes were made as shown in Table 3 in the kind and quantity of the hardener. In Example 10, one part by weight of dibutyltin dilaurate (DBTDL) of Tokyo Kasei Co. was used as the hardener, as shown in Table 3. Then, the coated films were formed on the substrates in the same manner as that of Example 6. The coated films according to Examples 7–10 were respectively about 41 μm, about 40 μm, about 42 μm and about 41 μm in thickness. The evaluation tests were conducted on the coated films in the same manner as that of Example 6. The results are shown in Table 3. In Examples 10, adhesion to the PVDF coated film was inferior, but all the results of the other evaluation tests were superior, as shown in Table 3.

COMPARATIVE EXAMPLE 4–7

In these comparative examples, the fluorine-containing copolymers, Copolymers 10–13, were respectively prepared in accordance with Example 6 except in that selective changes were made as shown in Table 4 in the kind and quantity of monomers for preparing Copolymers 10–13. Then, the fluorine-containing graft copolymers, Graft Copolymers J–L, were respectively prepared in Comparative Examples 4–6 in accordance with Example 6 except in that selective changes were made as shown in Table 4 in the kind and quantity of monomers for preparing Graft Copolymers J–L. In Comparative Example 7, the graft copolymerization was not conducted.

In Comparative Example 4, the peroxy-containing monomer was omitted in the preparation of the fluorine-containing copolymer. A varnish of a graft copolymer obtained in Comparative Example 4 was not transparent, as evaluated as "B" in Table 3. In Comparative Example 5, the hydroxyl-containing monomer and the carboxyl-containing monomer were omitted in the preparation of the fluorine-containing copolymer. In Comparative Example 6, about 210 wt %, based on the total weight of the fluorine-containing copolymer, of the monomer composition was polymerized in the graft copolymerization. In Comparative Example 7, the peroxy-containing monomer was omitted in the preparation of the fluorine-containing copolymer. In Comparative Example 7, a varnish of the fluorine-containing copolymer was transparent, and the fluorine-containing copolymer had a hydroxyl value of 89 mg KOH/g and an acid value of 70 mg KOH/g.

In Comparative Examples 4–6, white enamel paints were prepared in accordance with Example 6 except in that Graft Copolymers J–L were used in place of Graft Copolymer E and that selective changes were made as shown in Table 3 in the kind and quantity of the hardener. In Comparative Example 7, a white enamel paint was prepared in accordance with Example 6 except in that there was used, in place of Graft Copolymer E, combination of 100 parts by weight of Copolymer 13 and 4 parts by weight of Graft Copolymer E and that the amount of the hardener was changed as shown in Table 3. Then, according to Comparative Examples 4–7, the coated films were formed on the substrates in the same manner as that of Example 6. The coated films according to Comparative Examples 4–7 were respectively about 44 μm, about 40 μm, about 41 μm and about 44 μm in thickness. The evaluation tests were conducted on the coated films in the same manner as that of Example 6. The results are shown in Table 3.

TABLE 4

| | Com. Ex. 4 | Com. Ex. 5 | Com. Ex. 6 | Com. Ex. 7 |
|---|---|---|---|---|
| Charged Monomers for Copolymer (g) | | | | |
| CTFE | 350 | 330 | 175 | 350 |
| TFE | — | 20 | — | — |
| BPAC | — | 20 | 5 | — |
| VPv | 193 | 250 | 75 | 193 |
| V9 | 88 | — | 44 | 88 |
| EVE | — | 50 | — | — |
| CHVE | — | 70 | — | — |
| AAA | — | 20 | — | — |
| EGMAE | 92 | — | 46 | 100 |
| UA | 11 | — | 5 | 10 |
| Copolymer Mol. Weight (Mn) | 11,000 | 8,500 | 12,000 | 9,800 |
| Charged Monomers for Graft Copolymer (g) | | | | |
| MMA | 225 | 280 | 400 | — |
| CHMA | — | 180 | 200 | — |
| HEMA | 33 | — | 150 | — |
| Xylene (wt %) | 700 | 700 | 750 | 400 |
| Grafting Degree (wt %) | 37 | 65 | 210 | 0 |
| Graft Copolymer Characteristics | | | | |
| Mol. Weight (Mn) | 9,000 | 14,000 | 40,000 | — |
| Varnish Transparency | B | A | A | — |
| OH Value (mg KOH/g) | 61 | — | 77 | — |
| Acid Value (mg KOH/g) | 4.0 | — | 1.8 | — |

The entire disclosure of each of Japanese Patent Application Nos. 8-148793 filed on Jun. 11, 1996, 8-321723 filed on Dec. 2, 1996, and 9-152582 filed on Jun. 10, 1997, including specification, claims, and summary, in incorporated herein by reference in its entirety.

What is claimed is:

1. A fluorine-containing resin used for preparing a paint, said resin being soluble in an organic solvent, said resin being prepared by a graft copolymerization of 100 parts by weight of a fluorine-containing copolymer with 1–200 parts by weight of a fluorine-containing copolymer with 1–200 parts by weight of a first monomer composition, said graft copolymerization being conducted in a manner that said first monomer composition is polymerized at a position of a peroxy group which is contained in said fluorine-containing copolymer, said fluorine-containing copolymer being prepared by copolymerizing a second monomer composition comprising (a) 20–70 mol % of a fluoroolefin; (b) 0.01–15 mol % of a monomer having said peroxy group; and (c) 20–70 mol % of a comonomer which is at least one of a carboxylic acid vinyl ester and a first monomer, wherein said carboxylic acid vinyl ester is represented by a general formula of

R—C(=O)OCH=CH$_2$ where R is a first group which is an alkyl group, a cycloalkyl group or an aromatic group, said first group having a carbon atom number of from 1 to 22, said alkyl group having an optional branch, each of said cycloalkyl group and said aromatic group having an optional alkyl substituent, said first group having at least one substituent which has been substituted for at least one hydrogen atom of said first group, said at least one optional substituent being selected from the group consisting of hydroxyl group, epoxy groups, amino group and alkoxysilyl groups, wherein said first monomer is at least one compound selected from the group consisting of vinyl ethers and allyl ethers, said first monomer being represented by a general formula of

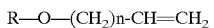

R—O—(CH$_2$)n-CH=CH$_2$ where R is defined as above, and n is 0 or 1, wherein said first monomer composition contains a second monomer which is at least one compound selected from the group consisting of methacrylic acid esters and acrylic esters, said second monomer being represented by a general formula of

CH$_2$=C(—R')C(=O)O—R where R is defined as above, and R' is hydrogen atom or methyl group.

2. A resin according to claim 1, wherein said second monomer composition further contains 1–30 mol %, based on the total number of moles of said second monomer composition, of a hydroxyl-containing vinyl ether or a hydroxyl-containing allyl ether.

3. A resin according to claim 1, wherein said first monomer composition further contains 0–50 mol %, based on the number of moles of said second monomer, of a copolymerizable monomer which is different from said second monomer.

4. A resin according to claim 1, wherein said fluorine-containing copolymer or said first monomer composition has a β-ketoester group.

5. A resin according to claim 1, wherein said fluorine-containing copolymer or said first monomer composition has a group which is represented by a formula of

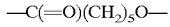

—C(=O)(CH$_2$)$_5$O— and is derived from a-caprolactone.

6. A resin according to claim 1, wherein said comonomer is free from any one of carboxyl group, hydroxyl group, epoxy group, amino group and alkoxysilyl group.

7. A resin according to claim 1, wherein said second monomer composition further contains 1–30 mol %, based on the total number of moles of said second monomer composition, of polymerizable monomer having at least one selected from the group consisting of carboxyl group, hydroxyl group, epoxy groups, amino group or alkoxysilyl groups.

8. A resin according to claim 1, wherein said second monomer composition further contains 0.1–10 mol %, based on the total number of moles of said second monomer composition, of an unsaturated carboxylic acid.

9. A resin according to claim 2, wherein said hydroxyl-containing allyl ether is a secondary-hydroxyl-containing allyl ether.

* * * * *